July 18, 1950

I. MUELLER 2,515,833

HOIST ATTACHMENT FOR TRUCKS

Filed July 13, 1945

INVENTOR
IRA MUELLER
By Paul, Paul & Moore
ATTORNEYS

July 18, 1950            I. MUELLER            2,515,833

HOIST ATTACHMENT FOR TRUCKS

Filed July 13, 1945            3 Sheets-Sheet 3

INVENTOR
IRA MUELLER
By Paul, Paul & Moore
ATTORNEYS

Patented July 18, 1950

2,515,833

UNITED STATES PATENT OFFICE 2,515,833

HOIST ATTACHMENT FOR TRUCKS

Ira Mueller, Minneapolis, Minn., assignor of one-half to Merchants Motor Freight, Inc., St. Paul, Minn., a corporation of Minnesota Application July 13, 1945, Serial No. 604,799

8 Claims. (Cl. 214—86)

This invention relates to new and useful improvements in hoists, and more particularly to a hoist attachment for power-propelled vehicles such as are commonly known to the trade as truck tractors, utilized for towing large semi-trailers which usually require that the towing vehicle or truck tractor be equipped with a fifth wheel.

In the operation of large fleets of trucks, it is not uncommon for a truck tractor to become inoperative at times when en route from one place to another. This may be caused by an accident, or by trouble developing in the operating mechanism of the towing vehicle. In such cases, it is usually necessary to dispatch a tow truck or wrecking car to the scene of the mishap. When the fleet operator must depend upon outside help for such service, such mishaps are expensive and often result in costly delays because a tow truck may not be available at the time.

The novel invention herein disclosed makes it possible to quickly convert a conventional truck tractor into a so-called "tow truck," whereby it may be utilized for towing in a crippled vehicle when such an occasion arises, and without in any way altering the construction of the truck tractor. Operators of large fleets of trucks usually have several truck tractors available at all times, and by the use of this invention, such available truck tractors may be quickly converted into a hoist-type tow truck, when necessary, for prompt dispatching to the scene of the trouble. Thus, by having one or more of these novel hoists available, a fleet operator will always have a "tow" truck available for immediate use for towing in a crippled vehicle. The hoist, when coupled to the fifth wheel of a conventional truck tractor, becomes, in effect, a component part of the tractor, and, in addition to rendering the truck tractor usable for towing service, makes it possible to use it for lifting heavy loads or objects and transporting them about from place to place, as will be understood.

An object of the present invention, therefore, is to provide a simple, efficient hoist which may be quickly demountably attached to the fifth wheel of a conventional truck tractor, whereby such tractor may be utilized for towing in disabled trucks, trailers, automobiles, and other vehicles requiring such service.

A further object of the invention is to provide a hoist comprising a suitable base provided with a coupling pin whereby the hoist may be quickly coupled to or uncoupled from the usual fifth wheel of a conventional truck tractor, and whereby such a tractor may be quickly converted into an apparatus for lifting or towing heavy objects.

A further and more specific object of the invention is to provide a portable hoist comprising a base plate having a coupling pin depending therefrom adapted to operatively engage the usual coupling member or jaws of a conventional fifth wheel, and suitable guide flanges being provided on the hoist base adapted to engage opposite faces of the fifth wheel, thereby to properly position the hoist on the fifth wheel of the truck tractor and prevent relative lateral movement of the hoist with respect to the fifth wheel.

Other objects reside in the novel and simple construction of the hoist; in the means provided on the bottom of the supporting base of the hoist to facilitate quickly mounting the hoist upon and coupling it to the conventional fifth wheel of a truck tractor; in the provision of a hoist attachment for truck tractors having means whereby it may be quickly coupled to the usual fifth wheel of the tractor by simply sliding the hoist base over and into engagement with the fifth wheel, or by backing the fifth wheel under the base of the hoist, when the latter is suspended from a suitable support; and, in the provision of such a structure which may be manufactured at low cost, and when mounted upon a truck tractor may be used for lifting heavy objects or towing other vehicles.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
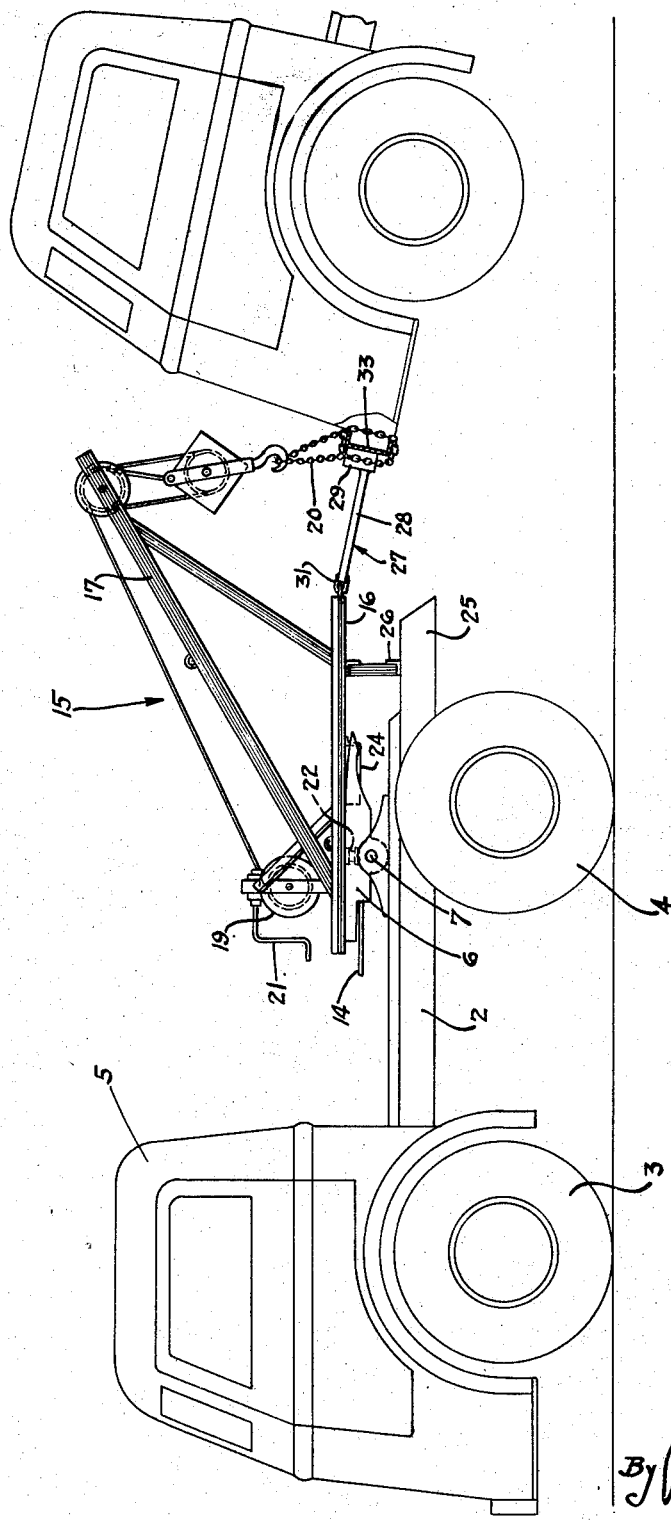
Figure 1 is a side elevation of a conventional truck tractor showing the invention applied thereto and utilized for towing another vehicle.

In the selected embodiment of the invention herein shown, there is illustrated in Figure 1, for purposes of disclosure, a conventional truck tractor comprising the usual chassis 2, front and rear wheels 3 and 4, cab 5, and fifth wheel 6. The fifth wheel 6 is of conventional construction and is mounted for pivotal movement on the truck frame about the axes of transversely disposed pivots 7, as is well understood. The fifth wheel is shown provided with a rearwardly facing re-entrant notch or opening 8, defined by inclined side walls 9 which have their inner ends disposed in spaced parallel relation to provide a restricted opening 11, terminating in alignment with the coupling member or jaw 12, pivoted at 13 to the under side of the fifth wheel. The coupling member 12 is provided with an operating handle 14, as is well known.

An important feature of the present invention resides in the provision of a portable hoist, generally designated by the numeral 15. This hoist comprises a base plate 16 upon which is mounted a rearwardly projecting boom 17 which carries a block and tackle 18 provided with a cable having one end wound upon a drum 19 which may be rotated to wind up or pay out the cable by manipulation of a crank 21 or, if desired, by a suitable power device, not shown.

Figure 2:
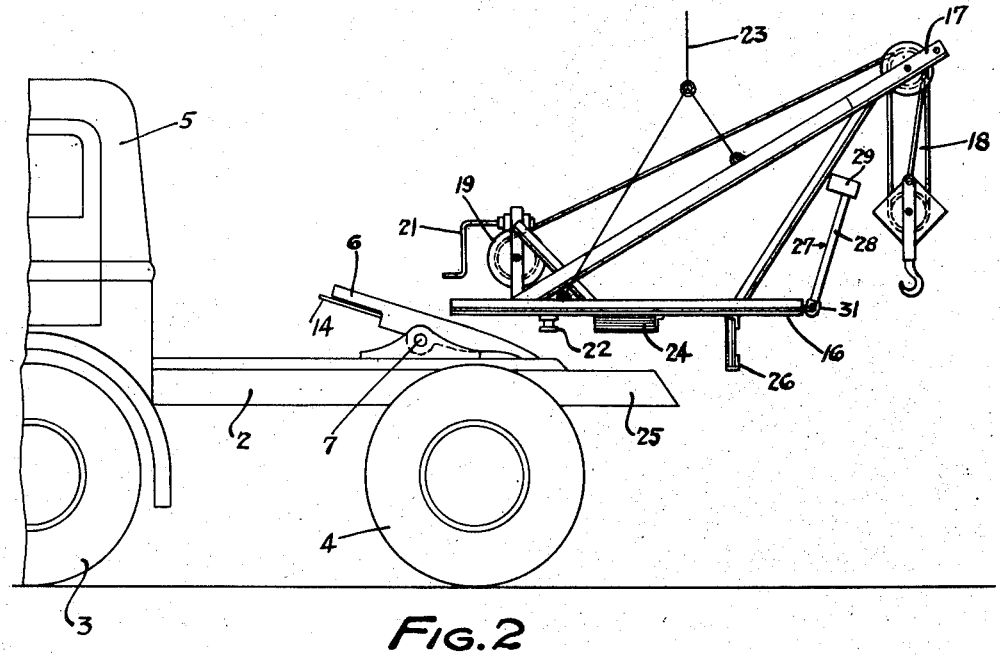
Figure 2 is a view showing the hoist about to be coupled to the fifth wheel of the truck tractor.
Figure 4:
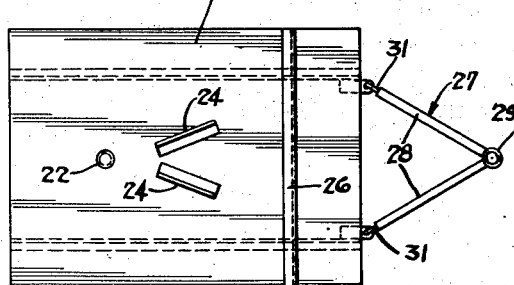
Figure 4 is a bottom view of the hoist base.
Figure 3:
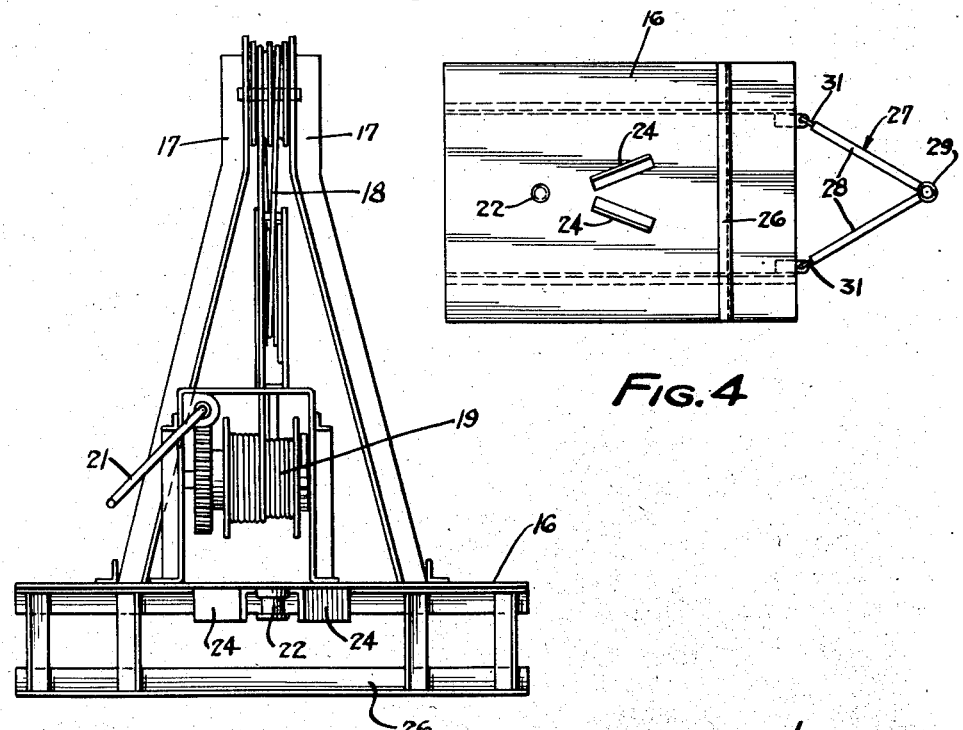
Figure 3 is an end view of the hoist showing the coupling pin and guide flanges provided thereon.

Another feature of the invention resides in the novel means provided for quickly coupling the hoist 15 to the usual fifth wheel 6 of the truck tractor. To accomplish this, a coupling pin 22 is secured to and depends from the bottom of the base plate 16, as best shown in Figure 2. The coupling pin 22 is adapted to be moved into coupling engagement with the coupling member 12 of the fifth wheel, as indicated in Figures 5 and 6.

The operation of coupling the hoist 15 to the fifth wheel may be accomplished by suspending the hoist from a suitable support such as a cable 23, and backing the truck tractor under the hoist in a manner similar to backing it under the front end of a semi-trailer, when it is desired to couple a trailer to the truck tractor. The coupling member 12 of the fifth wheel, as is well known, is so arranged that when in open position, indicated in dotted lines in Figure 6, and the coupling pin 22 of the hoist engages it, it automatically swings into locking position, as shown in dotted lines in Figure 6, thereby coupling the hoist to the fifth wheel 6 of the trailer, as shown in Figures 1 and 5.

To prevent the hoist from pivoting about the coupling pin 22, depending flanges 24 are secured to the bottom face of the base plate 16 and are arranged to engage the opposed faces 9 of the re-entrant opening 8 provided in the fifth wheel. The flanges 24 are so arranged that they will engage the opposed faces 9, when the coupling pin 22 reaches a position in alignment with the coupling member 12, whereby when the coupling member 12 interlocks with the coupling pin 22, the hoist will become firmly secured to the fifth wheel 6.

Figure 5:
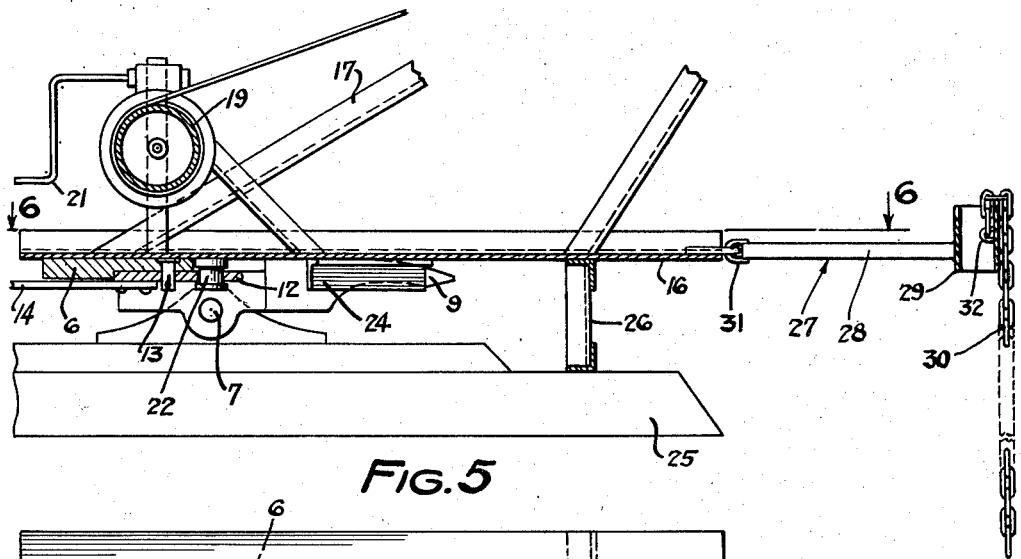
Figure 5 is a detail sectional view on the line 5—5 of Figure 6.
Figure 6:
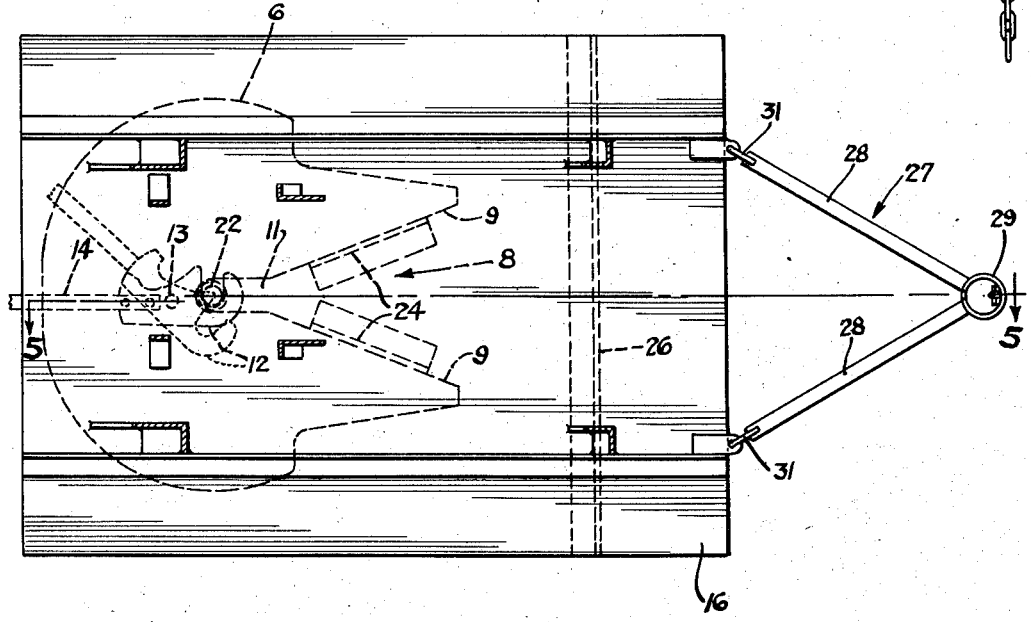
Figure 6 is a sectional plan view on the line 6—6 of Figure 5.

When the hoist is to be used in conjunction with a truck tractor such as illustrated in Figures 1 and 2, wherein the side rails 25 of the truck frame have their upper faces disposed considerably below the upper face of the fifth wheel, when the latter is in operative horizontal position, as shown in Figures 1 and 5, a suitable cross member 26 is preferably secured to the bottom face of the base plate 16 adapted to engage or seat upon the upper face 5 of the side rails 25 of the truck frame. Thus, when the hoist is coupled to the fifth wheel, as shown in Figure 1, it becomes, in effect, a component of the tow truck and cannot relatively shift its position thereon when used for towing a wrecked vehicle, as shown in Figure 1.

To facilitate towing a crippled truck, as shown for example in Figure 1, a suitable draft member, generally designated by the numeral 27, is connected to the rear end of the base plate 16, as best shown in Figure 6. The draft member 27 is shown comprising diverging struts 28 having their rear end portions suitably secured to a tubular coupling member 29 and their forward ends pivotally connected to the plate 16 by such means as links 31.

Figure 7:
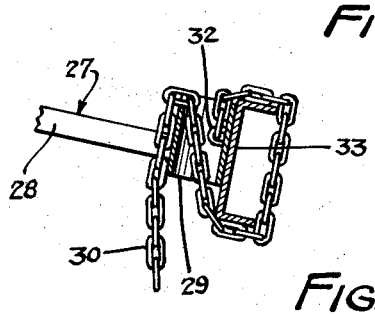
Figure 7 is a detail sectional view showing the draft members of the hoist coupled to the bumper of the vehicle to be towed.

When coupling a crippled vehicle to the truck tractor, a suitable chain 20 is wound about the bumper 33 and engaged with the hook of the tackle block, as shown in Figure 1, and the hoist is then operated to elevate the front end of the crippled truck to a height whereby the tubular coupling member 29 may be engaged with the bumper, as shown. The coupling member 29 has one end of a chain 30 secured to the inside thereof by such means as an eye 32, and when the hoist is not coupled to a truck bumper, the chain 30 may hang from the coupling member 29, as shown in Figure 5. When coupling the hoist to the bumper, the chain 30 is passed over the bumper and its free end is then threaded upwardly through the coupling member 29. One of its links is then dropped into a slot or notch provided on the upper edge of the coupling member, as shown on Figure 7, whereby the bumper is safely secured to the coupling member 29, as will be understood.

When a crippled truck is thus coupled to the hoist, it will be noted that the weight of the crippled vehicle is carried by the hoist while the draft load or drawbar pull will be taken up by the draft member of frame 27, as will be understood.

The draft member 27 retains the front end of the truck in spaced relation to the rear end of the tow truck so that the crippled vehicle may readily be towed up and down hills without difficulty. It also permits free turning movement of the two vehicles.

In the drawings I have shown the hoist equipped with manual means for operating the winding drum, but it is to be understood that, if desired, a suitable motor or power unit may be mounted directly upon the hoist base 16 without departing from the scope of the invention.

From the foregoing, it will be noted that by mounting the hoist 15 upon a truck tractor, as herein disclosed, a conventional truck tractor may readily and quickly be converted into a so-called tow truck or wrecking car without requiring any changes in the construction of the truck tractor nor its fifth wheel, the hoist being coupled thereto in identically the same manner as a semi-trailer would be coupled to the truck tractor.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. The combination with a truck tractor including a fifth wheel provided with a coupling member, of a portable hoist having a coupling pin adapted to be detachably coupled to the coupling member of the tractor wheel, and means on the hoist engageable with means carried by the truck, thereby to guide the coupling pin of the hoist into operative engagement with the coupling member.

2. The combination with a truck tractor including a fifth wheel provided with a coupling member, of a portable hoist having a coupling pin adapted to be detachably connected to the coupling member on the tractor fifth wheel, thereby to couple and secure the hoist to the truck tractor, and means on the hoist cooperating with means on the fifth wheel for accurately guiding the coupling pin into coupling engagement with the coupling member.

3. The combination with a truck tractor including a fifth wheel provided with a coupling member, of a portable hoist comprising a base having a coupling pin secured thereto and depending therefrom, and means on said base for guiding the coupling pin into operative engagement with the coupling member on the fifth wheel, and whereby the fifth wheel and coupling member provide the sole means for detachably securing the hoist to the tractor.

4. The combination with a truck tractor including a fifth wheel provided with a coupling member, and said fifth wheel having a re-entrant opening therein having its inner end terminating in alignment with the coupling member, of a hoist comprising a supporting base, a coupling pin depending from said base, and means on said base for engaging the opposed walls of said re-entrant notch and guiding the coupling pin of the hoist into operative engagement with the coupling member of the fifth wheel and preventing relative lateral movement of the hoist on the truck tractor.

5. The combination with a vehicle including side frame members having a fifth wheel mounted thereon, and said fifth wheel having a re-entrant notch or opening therein and being provided with a coupling member, of a hoist comprising a rearwardly extending base plate, a coupling pin depending from the forward portion of the base plate adapted to interlock with the coupling member on the fifth wheel, means on said base for engaging the opposed walls of said re-entrant notch and to guide the hoist into proper position upon the vehicle, and a cross member secured to the rear portion of said base plate adapted to engage the side frame members of the vehicle, thereby to maintain the hoist in horizontal position upon the vehicle.

6. A hoist adapted to be mounted upon and coupled to the fifth wheel of a conventional truck tractor, said hoist having a base plate provided with a coupling pin, inclined flanges depending from the base plate adapted to engage opposed faces of the fifth wheel, when the coupling pin of the hoist is coupled to the fifth wheel thereby to properly position the hoist with respect to the fifth wheel whereby the hoist is supported entirely upon the truck tractor.

7. A hoist adapted to be mounted upon and coupled to the fifth wheel of a conventional truck tractor, said hoist having a base plate provided near one end with a coupling pin, inclined flanges depending from the base plate adapted to engage opposed faces of the fifth wheel, when the coupling pin of the hoist is moved into coupling engagement with the fifth wheel, thereby to properly position the hoist with respect to the fifth wheel and whereby the hoist is supported entirely upon the truck tractor, and a pair of diverging draft members pivotally connected to the hoist base and having means at their rear ends for attaching them to a vehicle to be towed.

8. A hoist adapted for mounting on a truck tractor including side rails and a fifth wheel provided with a coupling member, said hoist comprising a base plate having a coupling pin secured to and depending from said plate for coupling the hoist to the coupling member of the fifth wheel of the truck tractor, guide flanges on said plate engageable with means on the fifth wheel for properly aligning the hoist with the fifth wheel of the truck, a cross member secured to and depending from the base plate of the hoist for engaging the side rails of the truck tractor, thereby to support the rear end of the hoist, draft members secured to the rear portion of said base plate at spaced points and converging inwardly from their connections with the base plate, a tubular coupling device secured to the rear ends of said draft members, and means in said coupling device for attaching it to a vehicle to be towed.

IRA MUELLER.

REFERENCES CITED

The following references are of record in the file of this patent:

UNITED STATES PATENTS

| Number | Name | Date |
| --- | --- | --- |
| 1,425,045 | Owen | Aug. 8, 1922 |
| 1,498,151 | Butler | June 17, 1924 |
| 1,517,547 | Ekberg | Dec. 2, 1924 |
| 1,783,189 | Green | Dec. 2, 1930 |
| 2,170,898 | Humphrey | Aug. 29, 1939 |
| 2,204,667 | Dooley et al. | June 18, 1940 |
| 2,360,654 | Day | Oct. 17, 1944 |